United States Patent [19]

Angermüller et al.

[11] Patent Number: 4,631,678
[45] Date of Patent: Dec. 23, 1986

[54] INFORMATION INPUT

[75] Inventors: Helmut Angermüller, Frankfurt am Main; Günther Hahlganss, Kriftel, both of Fed. Rep. of Germany

[73] Assignee: VDO Adolf Schindling AG, Frankfurt am Main, Fed. Rep. of Germany

[21] Appl. No.: 612,102

[22] Filed: May 18, 1984

[30] Foreign Application Priority Data

May 27, 1983 [DE] Fed. Rep. of Germany ....... 3319224

[51] Int. Cl.⁴ ............................................. G06F 15/50
[52] U.S. Cl. .................................... 364/424; 364/449; 340/995; 340/988
[58] Field of Search ............... 364/424, 436, 444, 449, 364/450; 340/988, 995; 73/178 R

[56] References Cited

U.S. PATENT DOCUMENTS

| | | | |
|---|---|---|---|
| 3,824,534 | 7/1974 | Straumsnes | 340/988 |
| 4,357,593 | 11/1982 | Tomkerwitsch | 340/988 |
| 4,494,201 | 1/1985 | Raymond et al. | 364/449 |
| 4,528,552 | 7/1985 | Moriyama et al. | 340/995 |

FOREIGN PATENT DOCUMENTS

| | | | |
|---|---|---|---|
| 0034993 | 9/1981 | European Pat. Off. | 340/955 |
| 0057032 | 8/1982 | European Pat. Off. | 73/178 R |
| 2938483 | 4/1981 | Fed. Rep. of Germany | 73/178 R |
| 2125233 | 8/1982 | Fed. Rep. of Germany | 73/178 R |

Primary Examiner—Parshotam S. Lall
Attorney, Agent, or Firm—Martin A. Farber

[57] ABSTRACT

The invention relates to an information input for a navigation device for highway vehicles in connection with which map markings which represent optically readable information and can be read by a reading device and fed to a data processing unit of the navigation device can be associated with a map, in particular a road map. A mark 6 can be associated with a starting or target point on the map and optically readable location markings 2 and 3 can be read by the reading device in the associated position of the mark 6 to the starting or target point.

22 Claims, 6 Drawing Figures

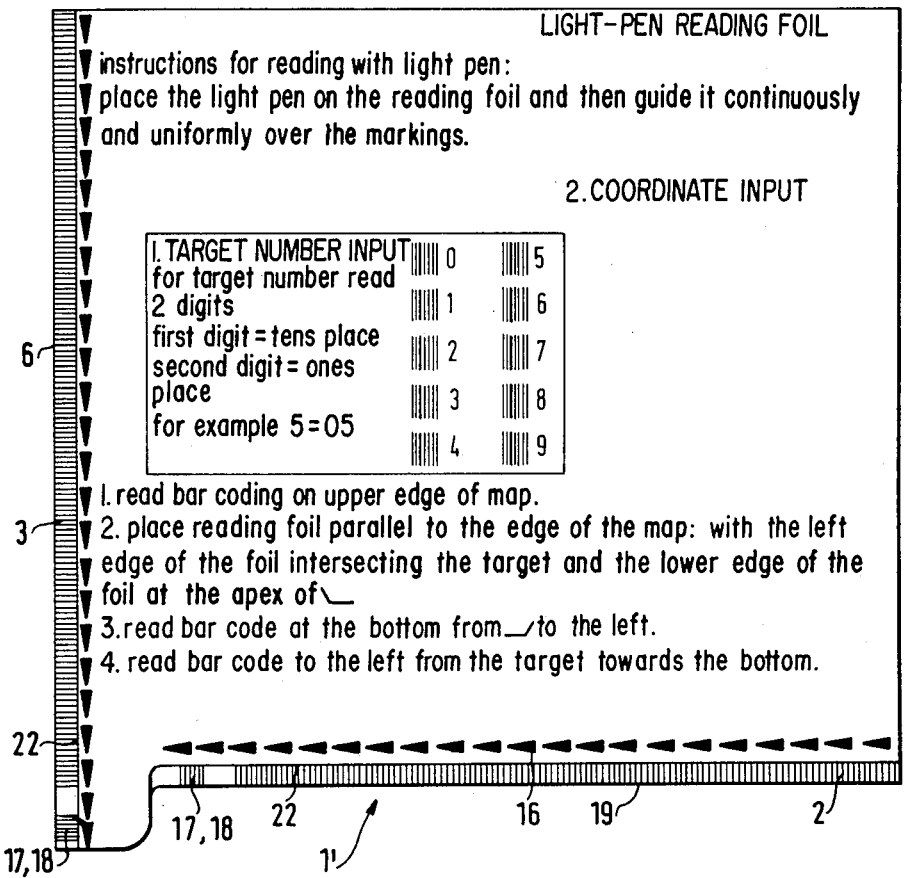
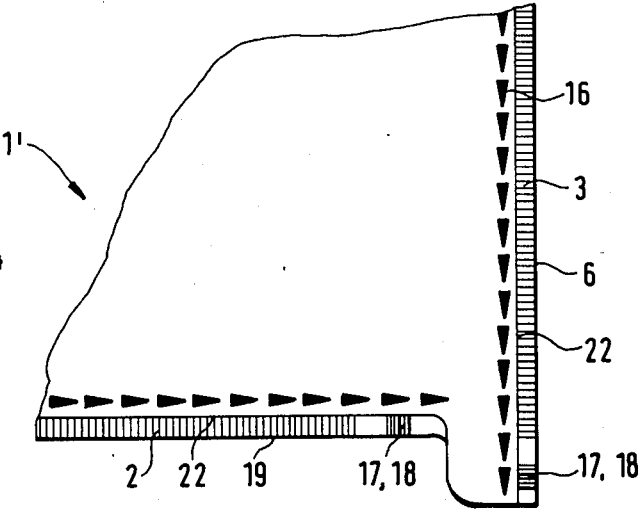

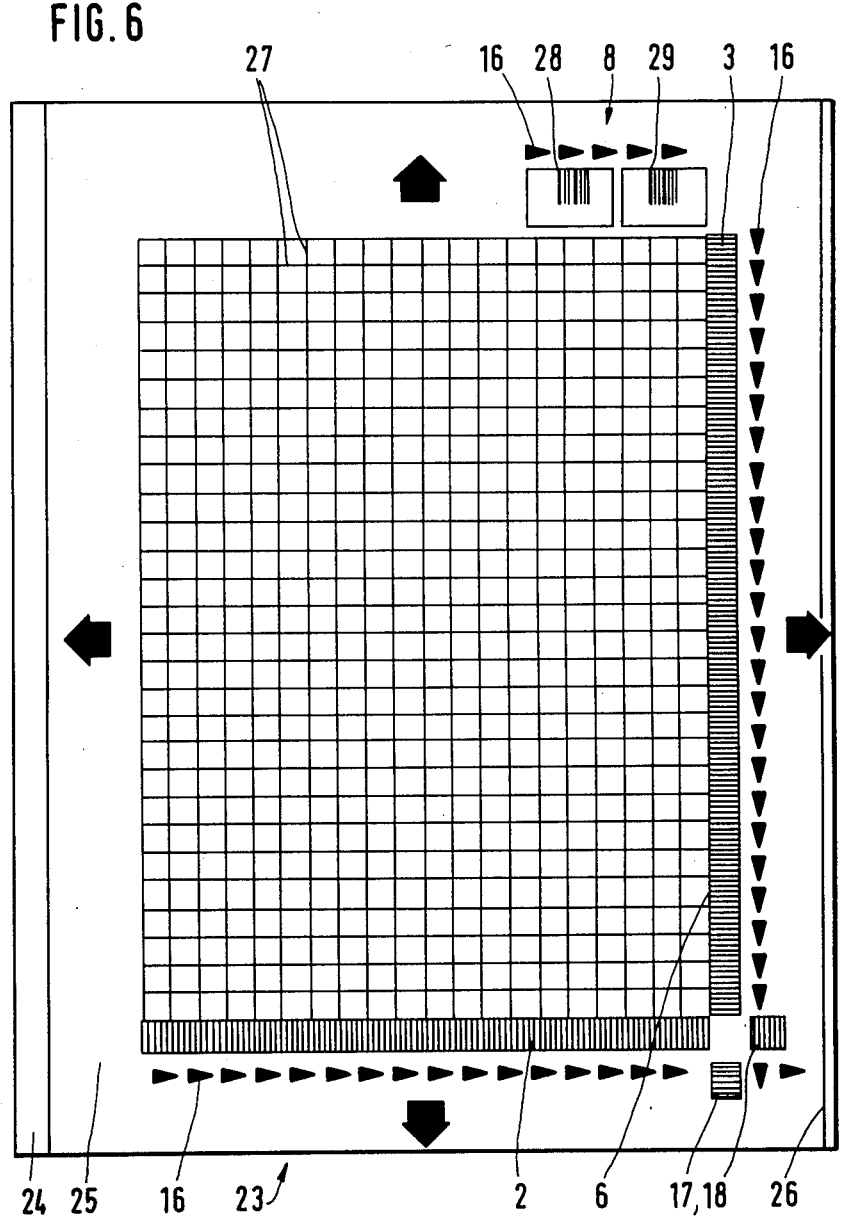

INFORMATION INPUT

The present invention refers to an information input for a navigating device for highway vehicles, in which map markings which represent optically readable information, and which can be read by a reading device and fed to a data processing unit of the navigating device, can be associated with a map, particularly a road map.

It is known in connection with such an information input to use maps in the form of transparencies which are projected on a display unit. For the identifying of the transparency which is desired in each case, optically readable markings which are formed by lines and permit a machine sorting of the desired transparency are provided on its edge. Light markings, or illuminated indications, on the projected map show the instantaneous position.

An individual automatic input of the starting or target point into the navigation device is not practical because a large amount of apparatus is necessary which is detrimental for reasons both of space and cost.

Accordingly, the object of the present invention is to create an information input for a navigation device for highway vehicles, in connection with which map markings which represent optically readable information and which can be read by a reading device and fed to a data processing unit of the navigating device can be associated with a map, which makes it possible, with simple means, to effect a simple manual individual input of data, and particularly data of starting and target points.

This object is achieved in accordance with the invention in the manner that a reference guide or mark can be associated with a starting or target point on the map and that optically readable location markings associated with the mark for the starting or target point can be read by the reading device. By simple association of the mark with the starting or target point, followed by optical reading by the reading device, input of the starting and target information into the data processing unit is possible in simple fashion. Cumbersome coordinate measurements on the map as well as input units with key fields for the input of the numerical values are not necessary.

The location markings preferably represent coordinate values and can be raster strips, where each strip comprises a plurality of parallel lines, where the strips extend vertically and horizontally.

In order to indicate to the data processing unit that the reading in of a raster strip has been terminated and which raster strip it is which has just been read in, an optically readable end marking or raster strip identifier can be arranged on one end of the raster strip.

The aforesaid mark which can be associated with the starting or target point can be formed in simple manner by a vertically or horizontally extending reference line. If a plurality of maps are present, the map markings arranged on the map can contain map identifying information so that the coordinate values entered are also immediately associated with the correct map by the data processing unit.

In addition to these input data, optically readable program commands or additional steps to be carried out by the navigation device can also be fed to the data processing unit.

Numerical values which can be associated with these special program commands can be fed to the data processing unit in such a way that optically readable number identifiers can be associated with the program commands.

The map markings of the map, the program commands, and the number identifiers are preferably formed by bar codes.

The reading of this information is simple in the manner that the location markings, the map markings the program commands, and the number identifiers can be read optically by means of a light pen. This permits an information input for navigation devices which can be employed in meaningful manner from the standpoint of space and apparatus requirements and from the standpoint of ease of operation in an automotive vehicle.

The ease of operation is furthermore increased by the fact that the light pen can be guided on a guide edge along the optically readable markings. Such a guide edge, even in the limited spaces available in automotive vehicles, makes reliable scanning with the light pen possible.

In order to avoid the reading of the markings in the wrong direction, the optically readable markings can be provided with reading direction characters which point in the direction to which the light pen is to be moved.

One advantageous development of the information input consists therein that a stencil bears the aforesaid mark as well as the location markings. By simply applying this stencil over or to the starting or target point on a map, for instance of an automobile road atlas, and then reading optically by means of the reading device, a dependable input of the starting and target information into the data processing unit is possible.

The reference line forming the mark can, in this connection, be formed by a vertically or horizontally extending edge of the stencil which can be placed against a corresponding reference line on the map.

In one advantageous embodiment, the stencil may be associated with a plurality of maps.

In addition to the location markings and the mark, the stencil may bear the map markings, the program commands and/or the number identifiers. In this way all necessary read-in data are present on a single part.

In another advantageous embodiment of the information input, the map can be provided with the mark, the location markings, the map markings and/or the program commands and/or the number identifiers. This permits of particularly simple handling with respect to ease of reading-in.

The optically readable markings may be imprints on the map or else may be applied to the maps by means of preprinted stickers.

If the map can be applied to a support which can be provided with the optically readable markings, then any desired map can in simple fashion be prepared for use by the information input described.

In order to facilitate the reading-in process the support may be a relatively stiff support plate.

If the map is capable of being covered by a transparent covering, then it is protected against damage.

This covering can, however, also contain a plurality of guidelines extending in the coordinate directions to the location markings, by which the correct starting point for the light pen on the location markings can be determined easily and more correctly.

In one simple and easily handled development the covering may be of foil.

Embodiments of the invention are shown in the drawing and will be described in further detail below.

In the drawing:

FIG. 3 is a second embodiment of a stencil according to the invention with user instructions omitted for clarity of illustration;

FIG. 4 is a partial view of the back of the stencil of FIG. 3;

FIG. 6 is a support in accordance with the invention.

Figure 1:
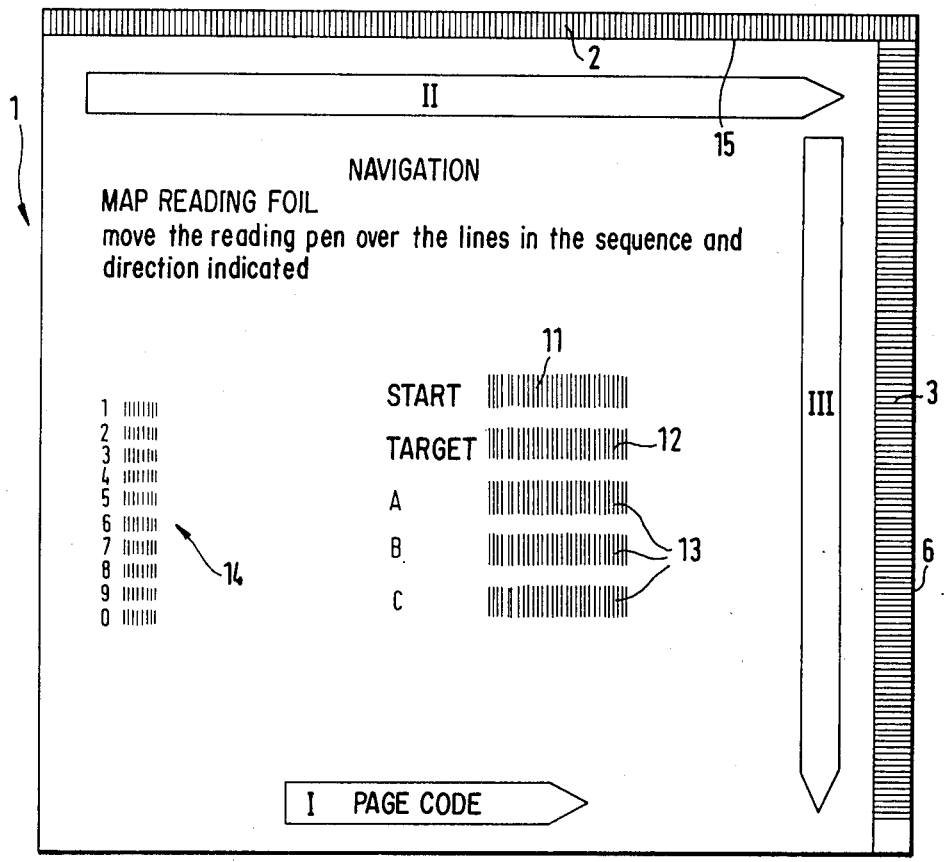
FIG. 1 is a stencil according to the invention with user instructions omitted for clarity of illustration.

The stencil shown in FIG. 1 is a foil bearing different imprints which can be read optically by a light pen (not shown). Along the upper horizontal edge there is a location marking 2 to identify the X coordinate and along the right vertical edge there is a location marking 3 for identification of the Y coordinate. Both location markings 2 and 3 are raster strips.

The right side edge of the stencil 1 at the same time forms a mark 6 which can be associated with a traveller's starting point 4 or a target point 5.

Figure 2:
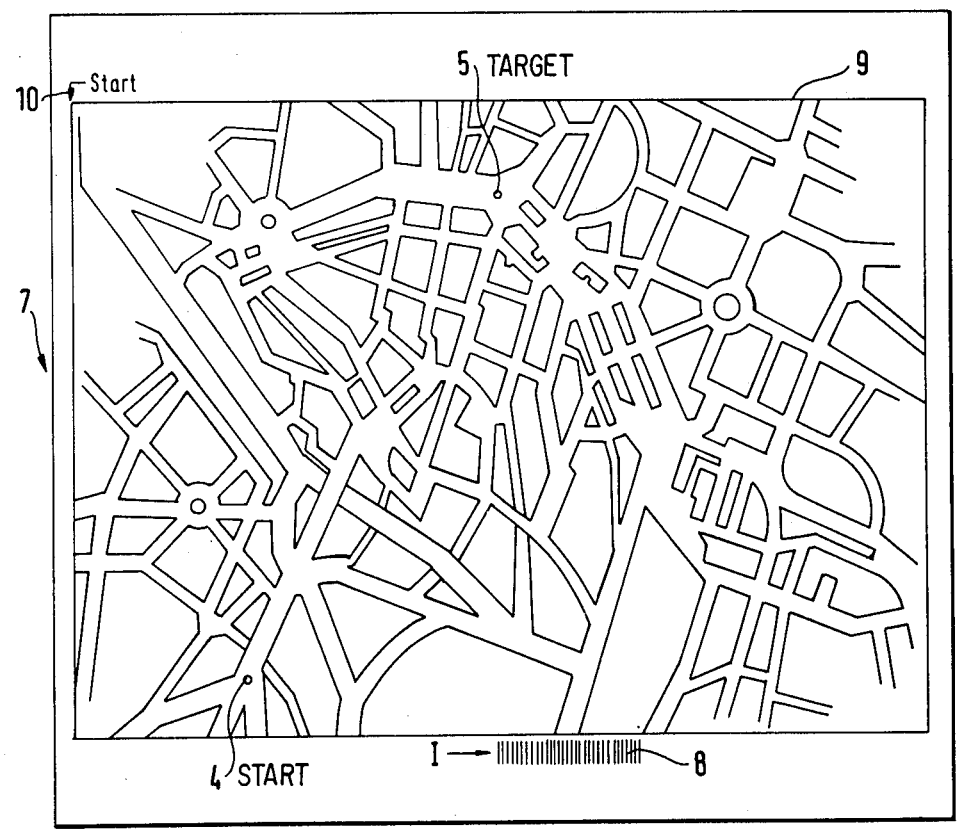
FIG. 2 is a map according to the invention for the stencil shown in FIG. 1.

The stencil 1 can be used together with a large number of maps, for instance a road map atlas, one map 7 of which is shown in FIG. 2. In this connection the entire cartography of all maps contained in the road atlas refers in its coding to a base point (not shown) which is located on one of the maps.

In order to be able to read the basic reference values of the map 7 into a data processing unit, this map 7 has a map marking 8 developed as bar code which contains the basic reference values of this map to be read into the data processing unit. In order to be able to read the desired travel route from the starting point 4 to the target point 5 into the data processing unit (not shown), the map marking 8 is, first of all, read-in by means of the light pen. This alerts the data processing unit as to which map is being used.

The bar code of the programming command "Start" 11 is now read-in (see FIG. 1).

The mark 6 of the stencil 1 which is formed by the right-hand vertical edge is now brought flush against the starting point 4 and the bottom side 15 of the location marking 2 is brought flush against the upper limiting line 9 of the map 7. Now starting from the start arrow 20, the light pen is now moved along the location marking 2 up to the end thereof.

In this way the X coordinate of the starting point 4 is read-in.

Thereupon, starting from the starting point 4, the light pen is moved along the location marking 3 vertically downward to its end, whereby the Y coordinate of the starting point 4 is read-in.

The bar code of the programming command "Target" 12 (FIG. 1) is now read-in, followed by the optical reading of the target point 5 in accordance with the principles and procedure of the abovedescribed reading-in of the starting point 4.

It is self-evident that the program commands "Start" and "Target" can also be given by the actuation of corresponding switches. However, input by means of bar code and light pen makes such switches unnecessary.

In order to be able to enter other pre-established program commands into the data processing unit, additional bar codes 13 are present on the stencil 1. Their meaning can be further modified by reading them in combined with the readable number identifiers 14.

However, it is also possible to use the number identifiers 14 independently of the bar codes. In this connection specific functions could be ascribed to the individual digits or digit combinations.

Figure 5:
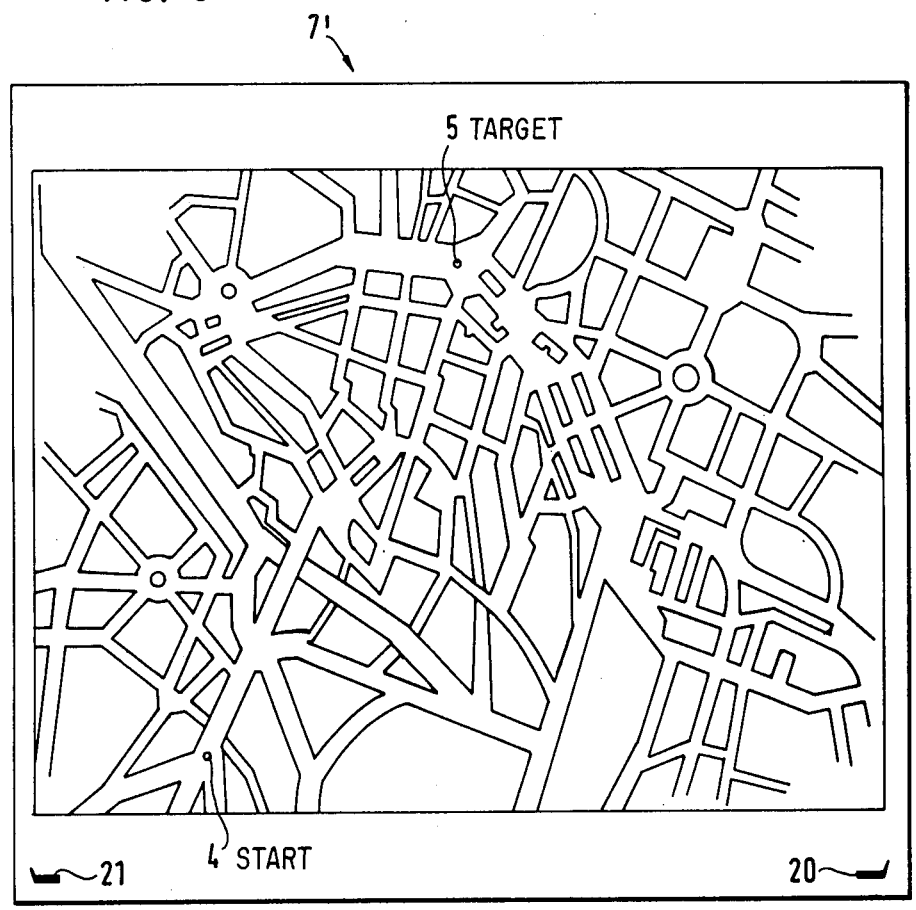
FIG. 5 is a map according to the invention for the stencil of FIGS. 3 and 4.

In FIGS. 3 and 4 there are shown the two sides of another stencil 1' which is intended for use with the map 7' as in FIG. 5. In this case, on the side shown in FIG. 3 the X coordinate is read in from right to left and in the side shown in FIG. 4 from left to right. The direction of reading is indicated by reading direction symbols 16.

By the two possibilities of the direction of reading of the X coordinate, start and target points which are located in the right and left edge regions respectively of the map 7' can also be read-in since the stencil 1 can also then be placed flat on the map 7'.

At the end of the location markings 2 and 3 as seen in the direction of reading, end markings 17 developed as bar codes and raster strip identifiers 18 are also arranged. When these end markings 17 and raster strip identifiers 18 are moved over by the light pen the fact is read-in for the corresponding location marking 2 and 3 respectively that the writing-in process of this locating marking 2 or 3 respectively is at an end as well as which location marking 2 or 3 is concerned.

For the reading-in of the coordinate values of the starting point 4 of FIG. 5, the stencil 1' is placed with the side shown in FIG. 3 upward, parallel to the edge of the map 7' and on the latter in such a manner that the left-hand edge of the stencil 1' intersects the starting point 4. This left-hand edge provides the mark 6. Furthermore, the lower edge 19 of the stencil must rest on the point of the right-hand arrow 20 of map 7'.

The light pen is now moved, starting from the arrow 20, over the location marking 2 and the adjoining end marking 17 and raster strip identifier 18. In this way the X coordinate is read-in.

Thereupon, starting from the starting point 4 the light pen is moved downward over the location marking 3 as well as the adjoining end marking 17 and raster strip identifier 18. The Y coordinate is thus read-in.

In order that the light pen can be moved reliably along the location markings 2 and 3, the stencil 1' has guide edges 22 at the edge of the location markings.

If a starting or target point which is to be read in is located close to the right-hand edge of the map, then the side of the stencil 1' shown in FIG. 4 is used for the reading-in of the coordinate. The reading-in process is in principle the same as that described above. Only now for the reading-in of the X coordinate the light pen is moved starting from the arrow 21 towards the right on the location marking 2.

In FIG. 6 there is shown a support 23 which bears a support plate 24.

On the support plate 24 location markings 2 and 3 developed as raster strips and having corresponding end markings 17 and raster strip identifiers 18 are arranged.

Bar codes 28 and 29 designate, for instance, the angle of declination and the page number or else the scale of the map to be applied to the support 23, the map not being shown in FIG. 6. All optically readable markings are provided with reading direction symbols 16.

Covering the markings and symbols, a transparent covering 25 developed as foil is fastened by its right-hand edge 26 to the support plate 24 so that it can be moved as a page away from the support plate 24.

The covering 25 has a plurality of vertical and horizontal guidelines 27 which form a checkerboard pattern.

In the region which is covered by the checkerboard pattern and is defined by the location markings 2 and 3 a map is arranged on the support plate 24. This can be done, for instance, in the manner that the surface of the support plate has a self-adherent coating by which both the map applied to it and the covering 25 adhere to the support plate 24.

Any desired map can be applied onto the support plate 24. It need only be cut to the size defined by the location markings 2 and 3. Furthermore, the corresponding scale and possibly the corresponding angle of declination can be fed into the data processing unit. For this purpose, for example, the bar codes 28 and 29 can be developed as stickers.

For the input of the coordinates of a starting or target point a light pen is placed on the location marking 3 at the level of the point. The guidelines 27 assist in this connection for orientation, so that, for example, by moving the light pen along to above the end markings 17 and raster identifier 18 the Y coordinate is then entered.

The X coordinate is then entered in accordance with the same principle.

Furthermore the map scale and the angle of declination as well as any possible further data referred to the map can be then read-in.

In accordance with the same construction as in FIG. 6, maps in a map book, such as for instance in an automobile road atlas, can be provided directly with the optically readable markings.

The development in accordance with FIG. 6, however, has the advantage that the driver of the car can prepare himself for the inputting of the information already with maps which he has in the manner that he cuts them to the size corresponding to the location markings 2 and 3 and applies them to the previously prepared support 23.

The information from the markings is read by a light pen of a conventional optical reading device. The mark may be formed as a transparency to allow light to propogate therethrough to permit detection of the markings. The identified start and target points, in combination with vehicular travel, as sensed by conventional navigation sensing devices, are employed by the data processor to show present location data.

What is claimed:

1. A system for identifying locations on a map for inputting data of the locations into an optical map reading device of a navigation device, the locations including a start point and a target point, the navigation device including a data processor, the system comprising
   stencil means configured for emplacement on the map for measuring coordinate distances on the map, said stencil means including a mark for association with a starting point or target point on the map, and
   location marking means constructed with optically readable location markings, and being disposed on said stencil means for inputting location data into said reading device for use by said data processor, said location data being inputted upon alignment of said mark of said stencil means with a coordinate of the starting point or target point.

2. The system according to claim 1, wherein said location markings represent coordinate values.

3. The system according to claim 2, wherein said location markings comprise vertically and horizontally extending raster strips.

4. The system according to claim 3, wherein said location marking means includes an optically readable end marking and raster strip identifier arranged on one end of a raster strip.

5. The system according to claim 1, wherein said map comprises optically readable markings as imprints on the map, which markings are displaced from the location marking to permit reading by said reading device.

6. The system according to claim 5, wherein said optically readable markings are applied to the map by means of stickers.

7. The system according to claim 1, further comprising
   a support, wherein said map can be applied to said support, said support being provided with optically legible markings and orienting said map with said stencil means.

8. The system according to claim 7, wherein said support is a support plate.

9. The system according to claim 1, wherein said stencil means further comprises a transparent covering for covering said map.

10. The system according to claim 9, wherein said covering comprises a plurality of guidelines extending in the coordinate directions of said location markings.

11. The system according to claim 9, wherein said covering comprises a foil.

12. The system according to claim 1, wherein said mark comprises a vertically or horizontally extending reference line.

13. The system according to claim 1, wherein map markings are provided on the map to enter map identifying information into said reading device, the locating markings of said location marking means being positioned on said stencil means away from the map markings to permit reading by said reading device.

14. The system according to claim 1, further comprising
   means aligned with said stencil means for optically feeding program commands to the data processing unit.

15. The system according to claim 14, wherein optically readable number identifiers are associated with the program commands.

16. The system according to claim 15, wherein said map markings, program commands and number identifiers are formed by bar codes.

17. The system according to claim 15, wherein the locating markings, the map markings, the program commands, and the number identifiers are optically readable by means of a light pen.

18. The system according to claim 17, wherein said location marking means comprises a guide edge wherein said light pen can be guided along said guide edge.

19. The system according to claim 1, wherein said location marking means comprises optically readable markings provided with reading direction characters.

20. The system according to claim 1, wherein said stencil means is formed by a vertically or horizontally extending edge of a stencil which edge can be placed along a corresponding reference line of the map.

21. The system according to claim 20, wherein said stencil can be associated with a plurality of maps.

22. The system according to claim 20, wherein said stencil comprises map markings, program commands, and said number identifiers.

* * * * *